United States Patent
Jenkinson

(10) Patent No.: US 7,735,503 B2
(45) Date of Patent: Jun. 15, 2010

(54) ADAPTABLE TREE BLIND FOR LADDER STRAND AND TREE STANDS

(76) Inventor: Scott Jenkinson, 11343 Oak Hill Rd., Davisburg, MI (US) 48350

( * ) Notice: Subject to any disclaimer, the term of this patent is extended or adjusted under 35 U.S.C. 154(b) by 0 days.

(21) Appl. No.: 12/349,229

(22) Filed: Jan. 6, 2009

(65) Prior Publication Data
US 2009/0173370 A1   Jul. 9, 2009

Related U.S. Application Data

(60) Provisional application No. 61/020,047, filed on Jan. 9, 2008.

(51) Int. Cl.
*E04H 15/02* (2006.01)
*E04H 15/44* (2006.01)
(52) U.S. Cl. .................. 135/96; 135/161; 135/135; 135/901
(58) Field of Classification Search .......... 135/90, 135/96, 135, 147, 116, 901, 120.2, 120.3, 135/159, 152; 182/115, 116, 124
See application file for complete search history.

(56) References Cited

U.S. PATENT DOCUMENTS

| | | | | |
|---|---|---|---|---|
| 2,547,770 | A | * | 4/1951 | Pelton ................ 135/126 |
| 3,690,334 | A | * | 9/1972 | Miller ................ 135/123 |
| 3,990,536 | A | | 11/1976 | Wilburn |
| 4,410,066 | A | | 10/1983 | Swett |
| 4,933,019 | A | | 6/1990 | Peruski |
| 4,951,696 | A | * | 8/1990 | Jones, Sr. .............. 135/90 |
| 5,613,512 | A | | 3/1997 | Bean |
| 5,630,439 | A | * | 5/1997 | Hutto ................ 135/90 |
| 5,927,435 | A | | 7/1999 | Benton |
| 6,021,794 | A | | 2/2000 | Guerra |
| 6,089,245 | A | | 7/2000 | Tseytlin et al. |
| 6,202,665 | B1 | | 3/2001 | O'Hare |
| 6,431,192 | B2 | | 8/2002 | O'Hare |
| 6,434,877 | B1 | | 8/2002 | Shelton |
| 6,510,922 | B1 | | 1/2003 | Hodnett |
| 6,883,644 | B1 | | 4/2005 | Braun et al. |
| 7,051,908 | B2 | | 5/2006 | Mignano |
| 7,100,626 | B2 | | 9/2006 | Livacich |
| 7,111,634 | B2 | | 9/2006 | Louie et al. |
| 7,137,399 | B1 | | 11/2006 | Ransom et al. |
| 7,174,995 | B1 | | 2/2007 | Alexander |

(Continued)

FOREIGN PATENT DOCUMENTS

JP   2001054326 A   2/2001

*Primary Examiner*—David Dunn
*Assistant Examiner*—Danielle Jackson
(74) *Attorney, Agent, or Firm*—Gifford, Krass, Sprinkle, Anderson & Citkowski, P.C.

(57) ABSTRACT

An adaptable blind for ladder stands and tree stands includes a platform that secures to a tree stand or ladder stand associated platform. A frame is assembled upon the platform and includes a plurality of upwardly extending and arcuately configured poles, these collectively establishing a superstructure which defines a three dimensional interior. A cover is assembled over the frame and encloses the interior, at least one access location in the cover material permitting a user to ingress and egress to and from the interior. A combination seat and ladder can be separately provided and which is both secured to the tree or pole as well as supported upon or against the platform.

15 Claims, 9 Drawing Sheets

U.S. PATENT DOCUMENTS

| | | |
|---|---|---|
| 7,182,091 B2 | 2/2007 | Maddox |
| 7,219,680 B1 | 5/2007 | Gresock |
| 7,246,630 B1 | 7/2007 | Ransom et al. |
| 2002/0078988 A1 | 6/2002 | Valpredo |
| 2006/0249640 A1 | 11/2006 | Hanson |
| 2006/0283492 A1 | 12/2006 | Livacich et al. |
| 2007/0033853 A1 * | 2/2007 | Ridge .............................. 43/1 |
| 2007/0144570 A1 | 6/2007 | Cooper |

* cited by examiner

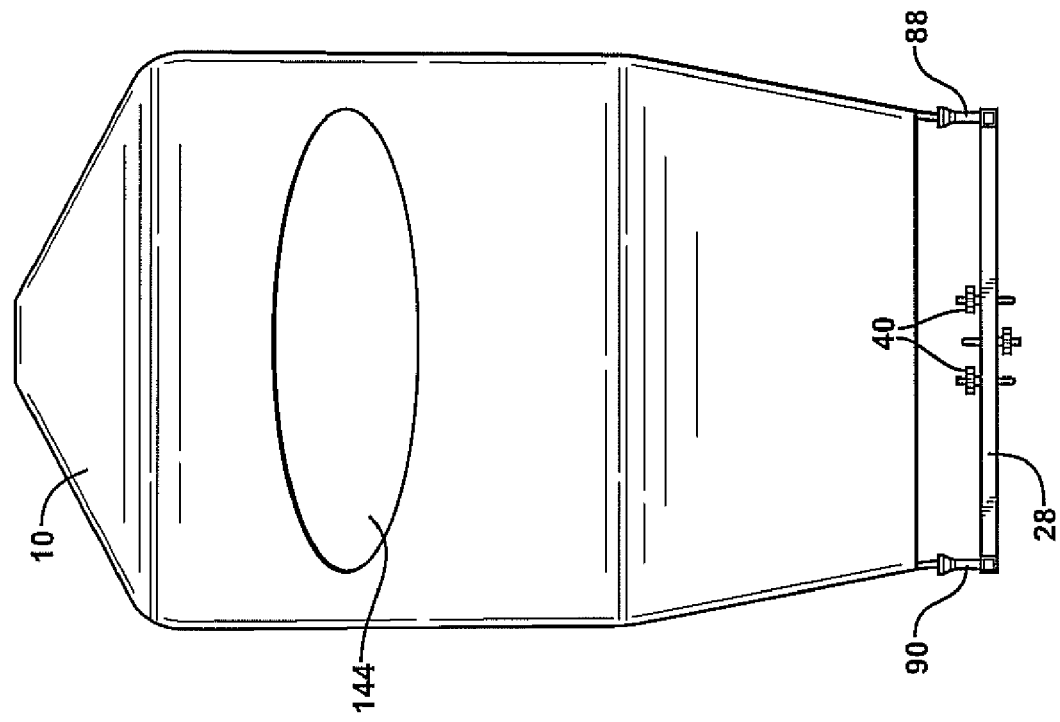
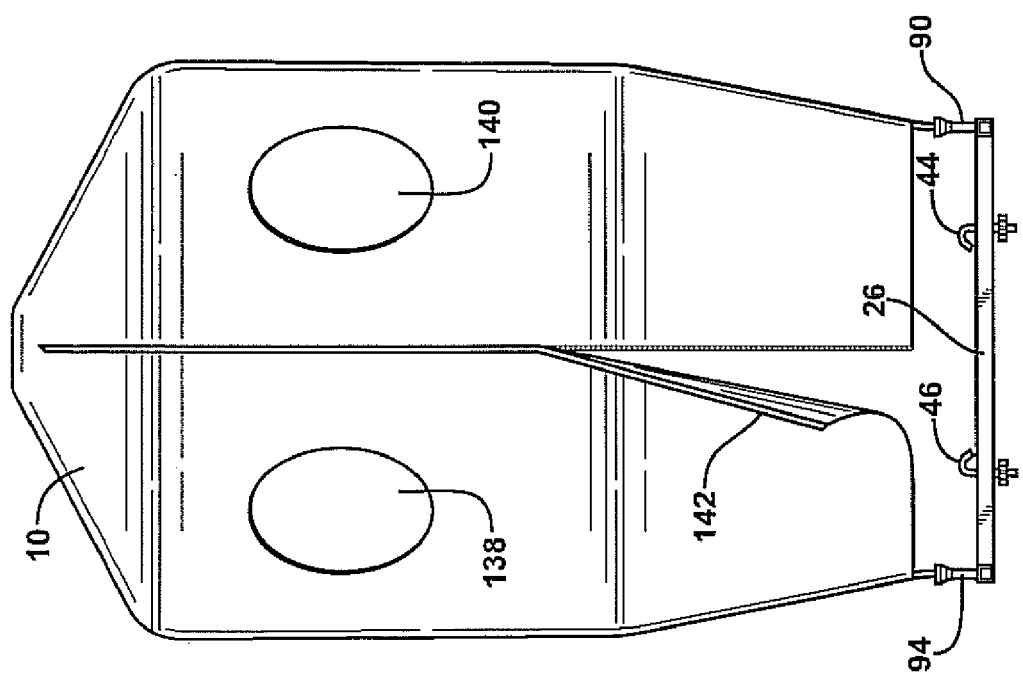

FIG. 7
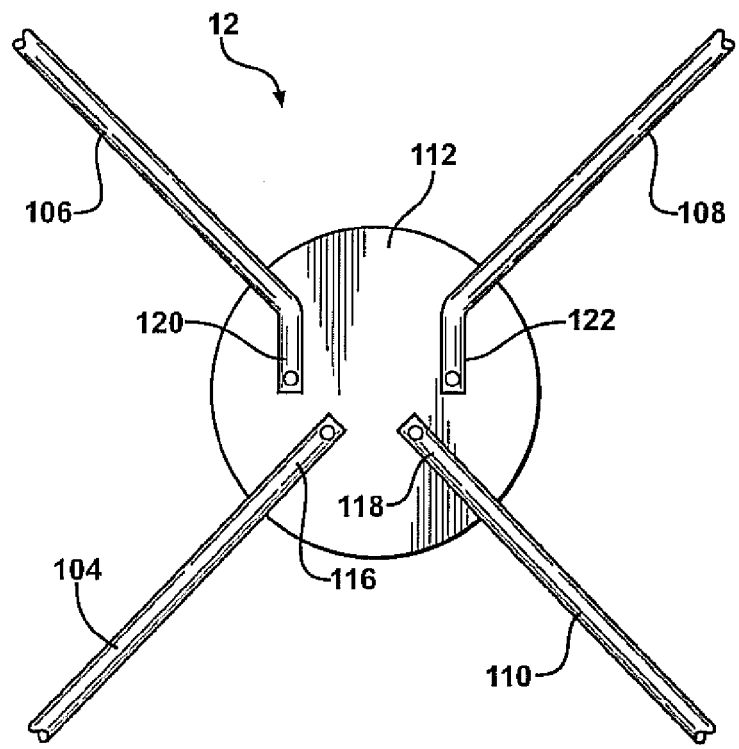
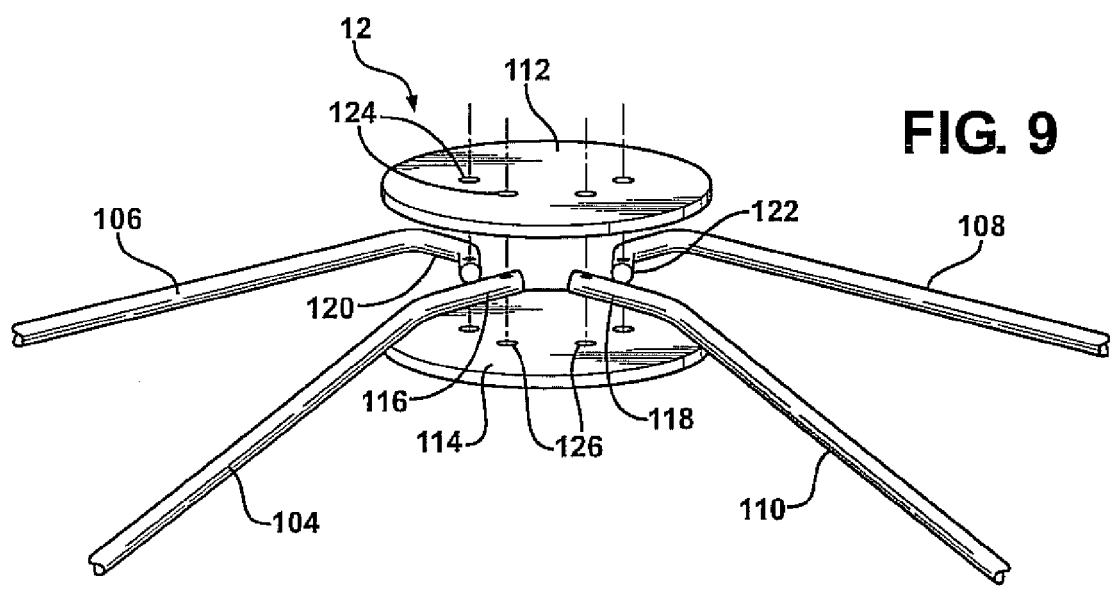
FIG. 9

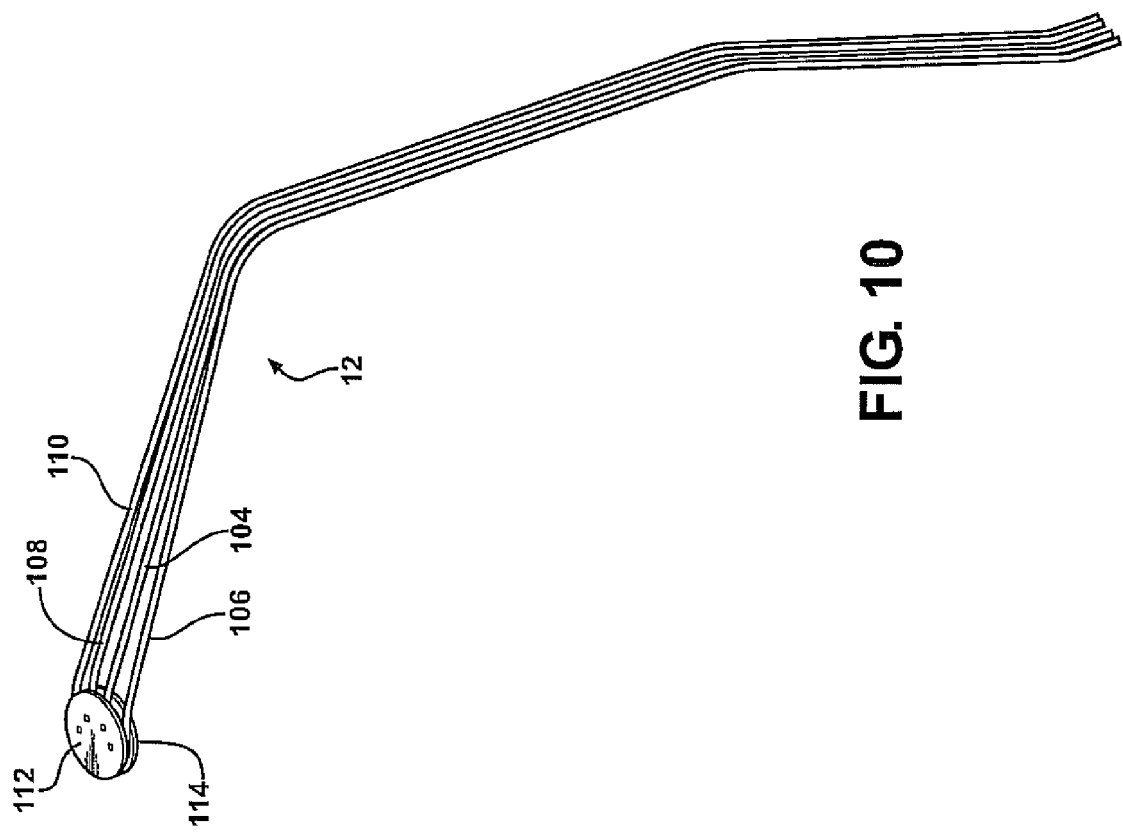
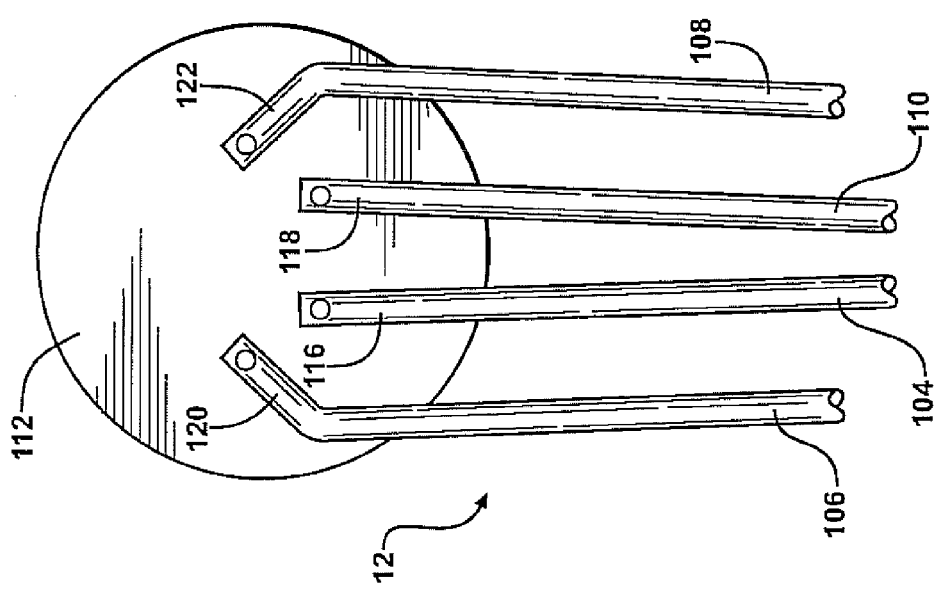

ADAPTABLE TREE BLIND FOR LADDER STRAND AND TREE STANDS

CROSS-REFERENCE TO RELATED APPLICATIONS

This Application is a Non-Prov of Prov (35 USC 119(e)) application 61/020,047 filed on Jan. 9, 2008 and entitled Adaptable Tree Blind for Ladder Stand and Tree Stands.

FIELD OF THE INVENTION

The present invention relates generally to hunting blind assemblies and the like. More specifically, the present invention discloses an adaptable and covered tree blind that can be used in an elevated condition with conventional tree stands and ladder stands. The hunting blind is configured to completely surround an entire area of the tree or ladder stand, providing the hunter with total concealment while providing protection against weather conditions.

BACKGROUND OF THE INVENTION

The present invention is documented with numerous examples of tree blind and collapsible shelter designs. The objective of such articles and assemblies is typically in providing some degree of either environmental shielding/insulation to the occupant, as well as further providing either or both of camouflage for shielding the occupant's presence, as well as providing for easy manipulation of weaponry (e.g. long barreled firearms and bows) carried by the occupant.

U.S. Pat. No. 4,933,019, issued to Peruski, teaches a version of a collapsible portable shelter including a plurality of cover supporting frame bars pivotally mounted at one end of a central hub, this further including vertically spaced apart plates. The frame bars include inverted L shaped support bars, each with a generally vertical and ground supporting leg and in integral and generally horizontal base received between the upper plates. This enables a terminal end of the horizontal base to be pivotally mounted in an aperture provided in one of the plates and, in combination with a recess arrangement defined in the other plates and the incorporation of a spring mechanism urging the plates together, facilitates holding the horizontal members within their defined recesses, but allowing the members to be rotated between stowed (side-by-side) and angularly disposed (spread apart) positions consistent with the pattern of the recesses.

U.S. Pat. No. 6,089,245, issued to Tseytlin, discloses a collapsible sun shade with hinged arms. The arms support a flexible sheet with a hub generally positioned at its center, and further such that the distal ends of the arms are connected to the sheet to support the same when the arms are spread apart.

U.S. Pat. No. 7,246,630, issued to Ransom, teaches a pre-assembled and collapsible tree stand hunting blind which folds into a compact package, and utilizing coil-able steel frame members which may be collapsed. The enclosure is adapted to be attached to the trunk of a tree and to an associated platform, such as a hunters tree stand. The enclosure is further provided with camouflage elements to render the user relatively invisible to game in the surrounding environment. Reference is also made to the collapsible structure with top supporting elements in Ransom U.S. Pat. No. 7,137,399.

Additional references of note include each of the versatile hunting or animal watching blind in Hanson 2006/0249640, the hunting blind and method of use in Maddox U.S. Pat. No. 7,182,091 and the hunting stand and blind in Hodnett U.S. Pat. No. 6,510,922.

SUMMARY OF THE INVENTION

An adaptable blind for ladder stands and tree stands includes a platform that secures to a tree stand or ladder stand associated platform. A frame is assembled upon the platform and includes a plurality of upwardly extending and arcuately configured poles, these collectively establishing a superstructure which defines a three dimensional interior. A cover is assembled over the frame and encloses the interior, at least one access location in the cover material permitting a user to ingress and egress to and from the interior A combination seat and ladder can be separately provided and which is both secured to the tree or pole as well as supported upon or against the platform.

Additional features associated with the platform include the provision of a plurality of interconnected length and width extending members, a further plurality of adjustable clamps associated with locations of the platform and which are adapted for receiving at least one of a tree or ladder stand platform of given dimensions. The clamps further include such as hooks capable of being fastened in order to draw the platform tight against a stand portion associated with the ladder. A plurality of channels are arranged in spaced apart and parallel extending fashion within the platform, the hooks being displaceably mounted within the channels and laterally adjusted to provide adaptability between multiple sized tree stands.

The poles each further exhibit an elongated and angled member which is secured at a lower end to a selected corner inserting location integrated into the platform and, at an upper end, in pivotally displaceable and interconnecting fashion with an upper support assembly, and to which the other poles are likewise secured. These may further include such as frame supported bracket fixtures located at corner locations of said platform and to which are secured said poles.

The upper support assembly includes a top plate and a spaced apart lower support plate, each of which includes mating apertured locations for receiving upper configured ends associated with each of the poles. In this fashion, the poles may be rotatably converted between expanded use and collapsed storage positions.

The cover further includes at least one of a canvas, mesh or fabric material, this further defining at least one access door located on a first selected side and at least one window being formed along one or more additional sides. According to additional variants, the cover can exhibit a specified shape and size and include a camouflage or other suitable decorative pattern.

BRIEF DESCRIPTION OF THE DRAWINGS

Reference will now be made to the attached drawings, when read in combination with the following detailed description, wherein like reference numerals refer to like parts throughout the several views, and in which:

FIG. 5 is a rear view of the covering material and showing a vertically extending and enclosing zipper with two access windows;

FIG. 6 illustrates either of left and right side views of the covering material and further showing (optionally zippered) access windows;

FIG. 7 is a top plan view of the upper support assembly associated with the plurality of pivotally engaged poles associated with the frame superstructure;

FIG. 8 is a top plan view of the upper support assembly and poles, and in which an offset feature associated with the rear poles allow them to be rotatably converted between expanded use and collapsed storage positions.

FIG. 9 is an exploded perspective illustration of the upper support assembly including a top plate and a spaced apart lower support plate, each of which exhibiting mating apertured locations for receiving upper configured ends associated with each of the poles;

FIG. 10 is a perspective of the poles which define the frame superstructure in the collapsed position of FIG. 9 and further illustrating a minimized gap between the poles, this reducing flex or bend of the poles during handling or transport when in the collapsed position;

DETAILED DESCRIPTION OF THE PREFERRED EMBODIMENTS

As will be described in additional detail in reference to the various illustrations disclosed herein, the adaptable hunting blind consists of three basic parts which are generally referenced to include a fabric, canvas, or mesh cover 10 (such as shown in detail in each of FIGS. 4-6 and which can exhibit any of a desired decorative or camouflage pattern), a frame (as generally shown at 12) and a platform 14. A more detailed description of the frame 12 and platform 14 will be had upon reference to the various succeeding illustrations of FIGS. 1-3, whereas additional illustrations and associated description directed to the covering material 10 is further provided in reference to FIGS. 4-6.

Figure 1:
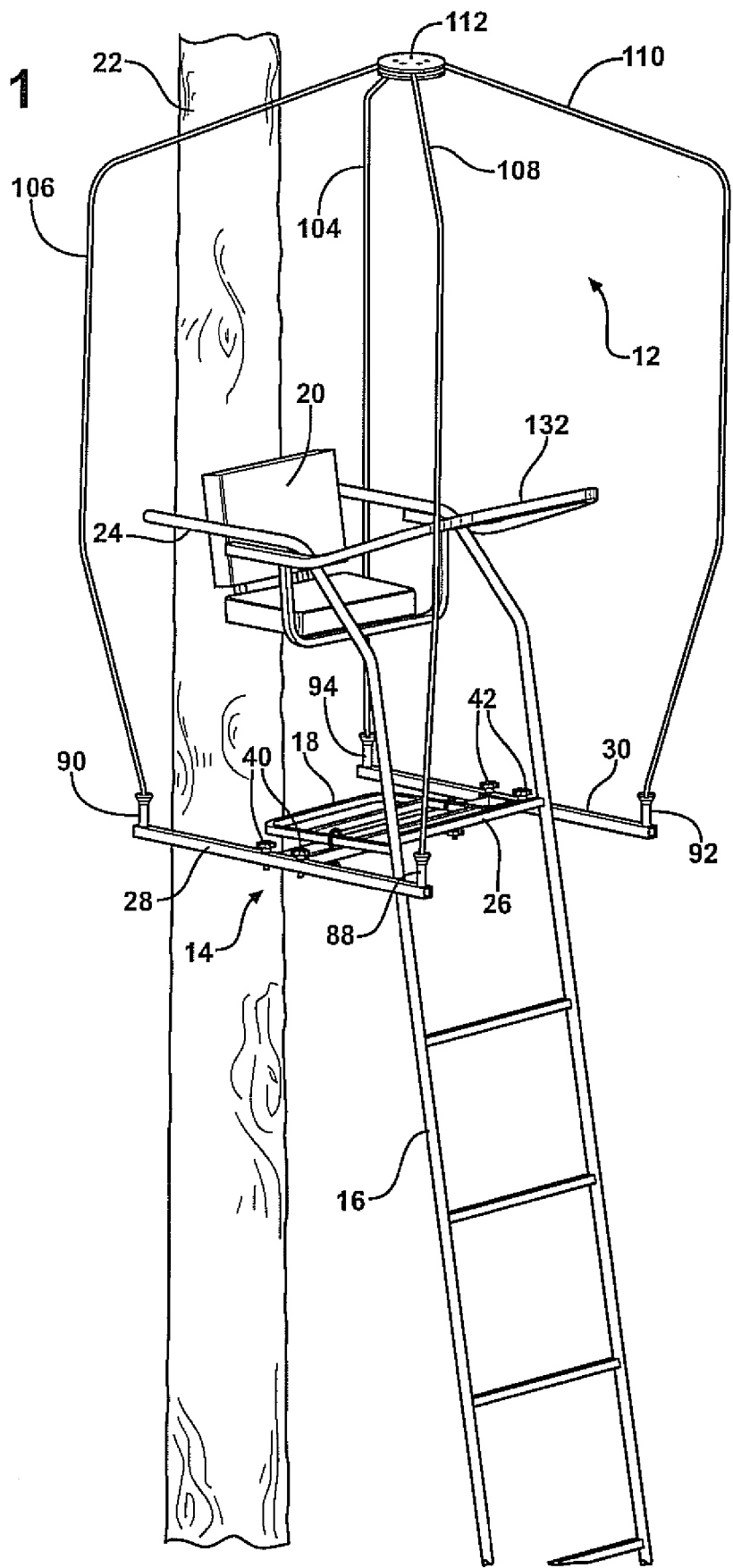
FIG. 1 is an environmental view of an adaptable tree blind in a first application in use with a combined ladder/seat and stand configuration, with the cover portion removed from the blind in order to reveal the superstructure frame and platform and the manner in which it is secured about a circumference of a tree or pole.
Figure 2:
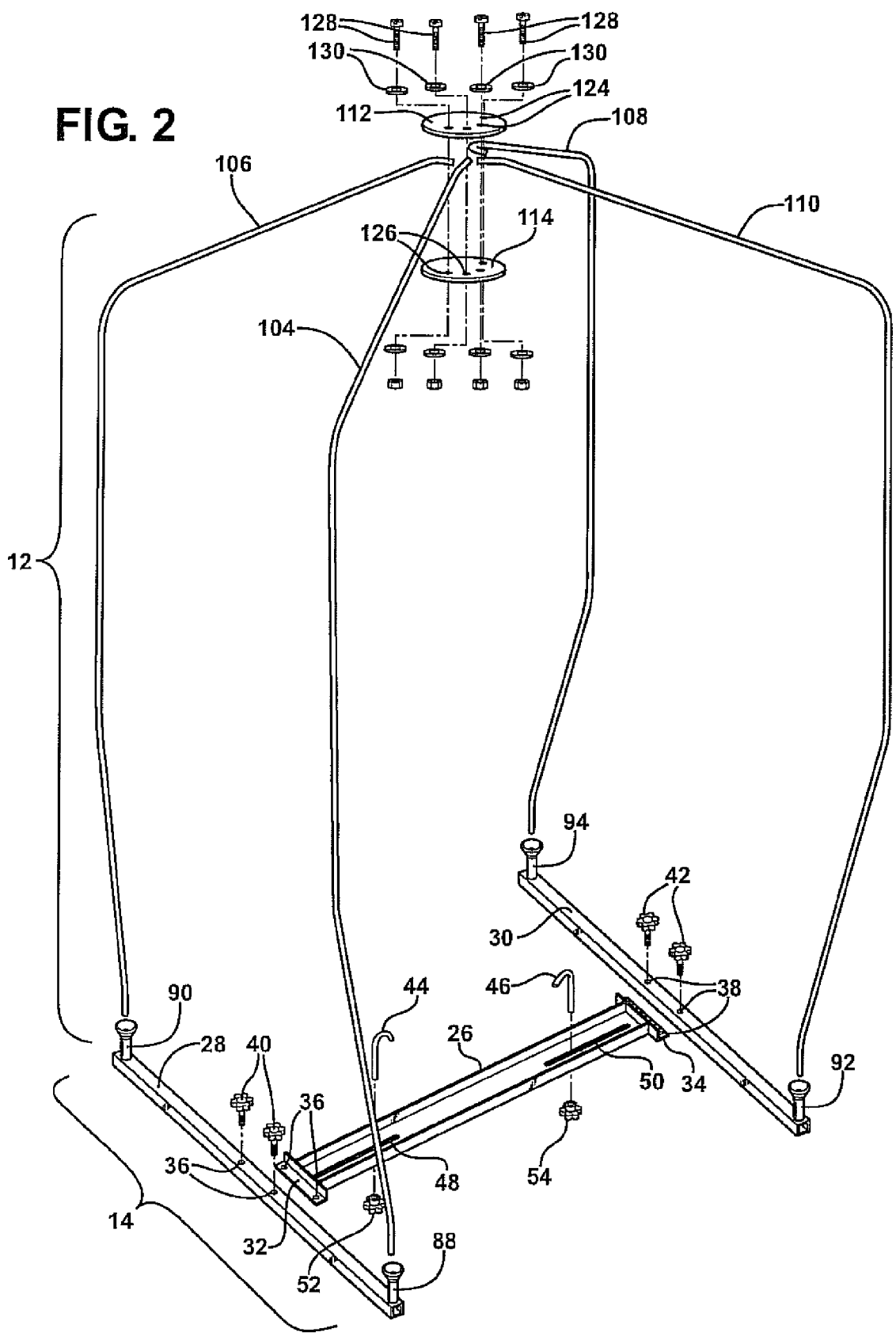
FIG. 2 is a perspective of the collapsible superstructure and platform associated with the tree blind.
Figure 3:
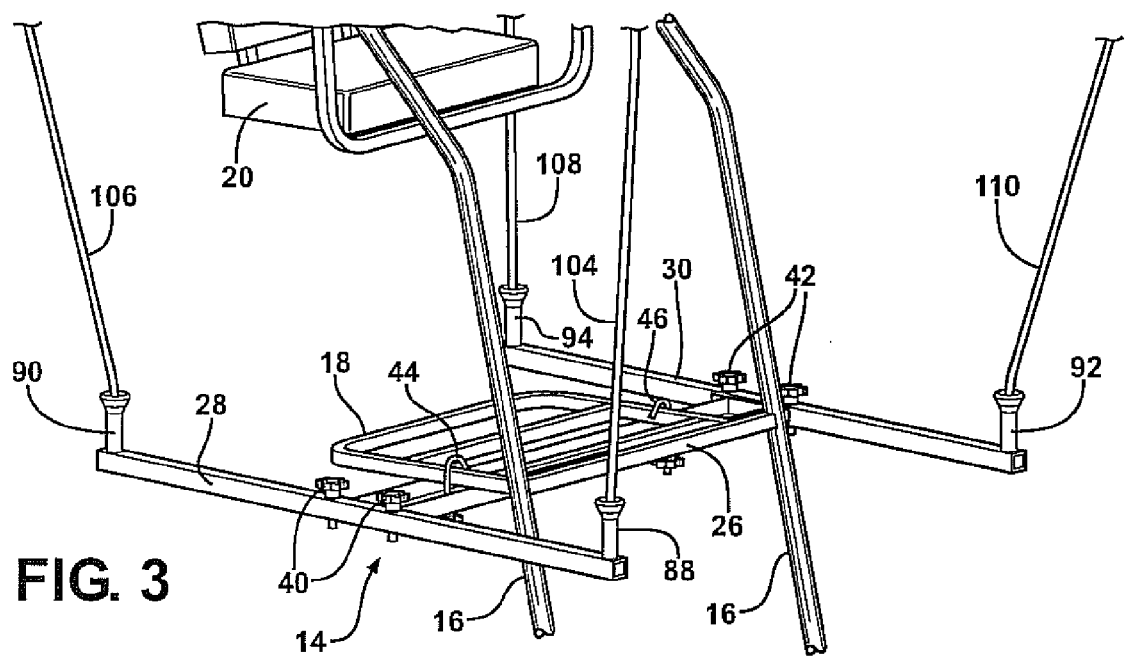
FIG. 3 is an enlarged and partially rotated view of the platform and lower extending portions of the superstructure in FIG. 2.

FIG. 1 is an environmental view of an adaptable tree blind in a first application in use with an optional ladder stand, whereas FIG. 2 is an enlarged perspective of the collapsible superstructure and platform associated with the tree blind and FIG. 3 is an enlarged and partially rotated view of the platform in FIG. 2. The blind's platform 14 connects the blind assembly to an optional associated ladder stand platform and which, as illustrated, includes a ladder portion 16, an angled, generally U shaped platform 18 (this extending in angular fashion from each of the spaced apart linear extending portions of the ladder and overlapping/securing upon the blind platform 14) and an optional seat portion 20 (this further being located at an upper end of the ladder stand and securing to an elevated location of a tree or pole (representatively illustrated at 22) by such as a circumference extending band, strap or bar (at 24). Although not clearly illustrated, it is further envisioned and understood that additional straps, bands, ropes and like can be provided for securing any portion of the assembly, including the seat or other location of the ladder platform, to the elevated location of the tree or pole.

Both the platform 14 and associated frame 12, as will be described in subsequent detail, can be constructed of various materials, not limited to steel, aluminum, fiberglass, or forms of high strength plastics, and given that they adhere to the dynamic and structural integrity requirements of the design. As best shown in each of FIGS. 1, 2, 3, 12 and 13, the platform 14 according to a first preferred embodiment is collapsible with threaded connections established between a single cross over beam 26 and a pair of crosswise extending and end connected support arms 28 and 30.

Figure 15:
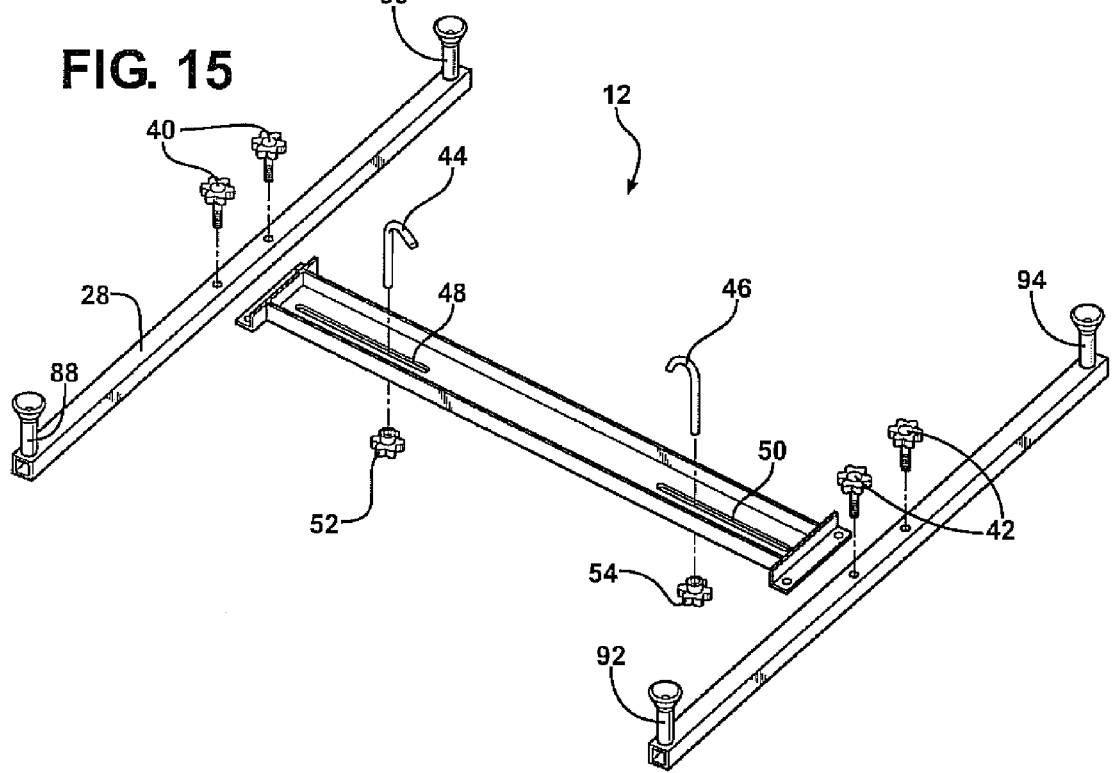
FIG. 15 is an exploded view illustrating the collapsible nature of the platform in FIG. 13.

The exploded views of FIGS. 2 and 15 each illustrate a pair of angled brackets 32 and 34 associated with opposite ends of the main cross over beam 26. Mating and aligning interiorly threaded apertures are established between the brackets 32 and 34 and (central) mounting locations associated with each of the end connected support arms 28 and 30 (see apertures 36 and 38 in FIG. 2), through which are inserted connecting knobs with threaded shafts (at 40 and 42) to assemble and secure together the beam 26 and support arms 28 and 30. This allows the platform to be broken down for improved storage or transport, such as into and out of a wooded area. Additionally, providing a more compact design improves both manufacturing and packaging aspects of the invention.

A pair of adjustable clamps, see at 44 and 46, are seated within extending and end disposed channels 48 and 50 defined in the main cross over beam 26. A further pair of underside engaged and interiorly threaded nuts (see knob shaped articles at 52 and 54) are provided and are selectively tightened in a rotated fashion with portions of the clamps 44 and 46 which extend through the linear channels 48 and 50, this in order to reposition laterally (inward/outward) the locations of the upper hook shaped ends of the clamps 44 and 46 in order to secure such as side locations of the ladder platform 18 which is overlapping supported upon the main assembleable platform 14.

The configuration of the laterally adjustable clamps provides adaptability between multiple sized tree stand or ladder stand platforms. The invention contemplates an upper hook shaped portion associated with each clamp sliding in and out along the cross over beam 26 of the blind's platform, and such that the hook portions are slid into required positions to allow attachment of associated side walls of the stand platform 18, and by which the upper hook shaped end of each of the clamp overhangs associated side walls of the stand platform 18. Once the hooks are connected to the stand's platform, the hooks get fastened down (again via the threaded and underside engaged knobs 52 and 54), thereby drawing the platform 14 tight to the ladder stand platform 18 (see again FIGS. 1 and 3). This provides the secure fit between the stand and blind platforms. After completing this step, the blind cover can then be installed onto the blind platform.

Figure 14:
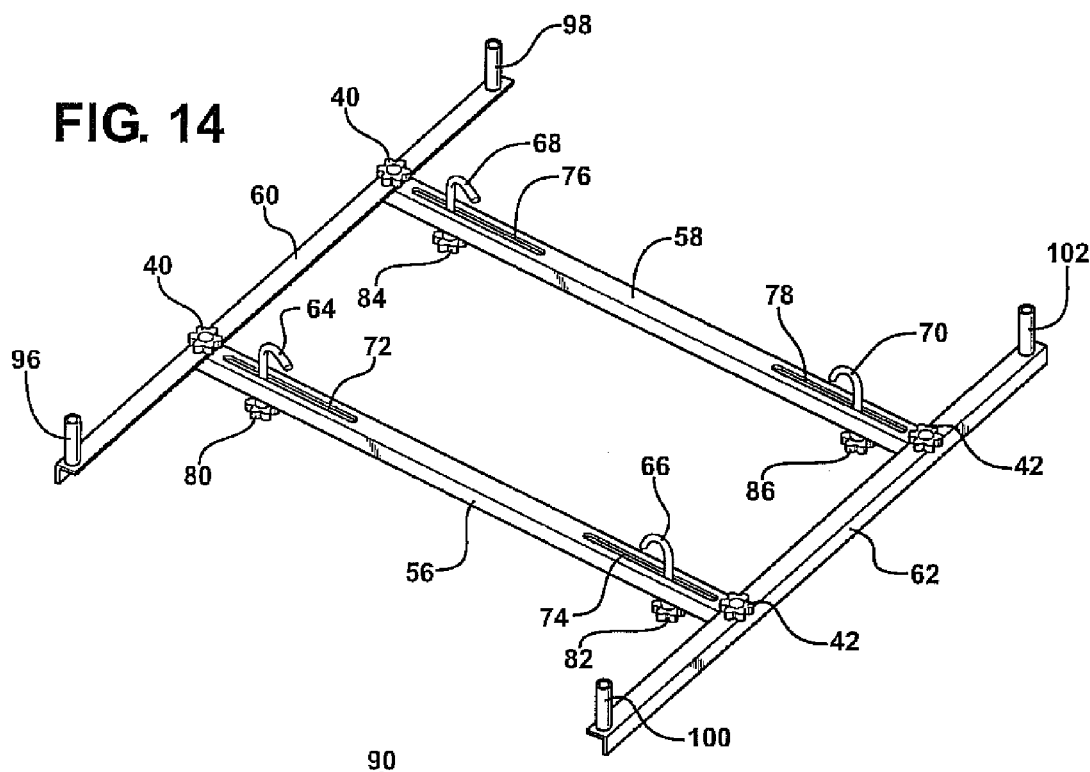
FIG. 14 is a perspective view of an alternate variant of collapsible platform with a pair of cross over beams.

FIG. 14 is a perspective view of an alternate variant of collapsible platform with a pair of cross over beams 56 and 58 interconnecting a pair of end connected support arms 60 and 62. In the variant of FIG. 14, pairs of clamps 64 & 66 and 68 & 70 are mounted within associated and linear extending channels 72 & 74 and 76 and 78 (these being capable of securing to multiple locations associated with such as a ladder stand platform as shown at 18). Connecting knobs/shafts are again shown at 40 and 42, each of these defining an aligning mounting location (via associated apertures) established between a selected one of the cross over beams 56 and 58 and support arms 60 and 62. Underside and threadably engaged knob shaped nuts are again provided (see at 80-86) and selectively engage and tighten underside protruding locations of the clamps 64-70, respectively.

The configuration of the cross over beams and end support arms in FIG. 14 is further modified, such as by making each of the support arms 60 and 62 exhibit an "L" angled profile, and so that the elements inter-assemble in the manner shown. Associated mounting support fixtures, at 88, 90, 92 and 94 are affixed or integrally formed with associated edge locations of each of the end support arms, such as those shown at 28 & 30 in FIG. 13. Modified support fixtures are further shown at 96, 98, 100 and 102 for end support arms 60 and 62 associated with the variant of FIG. 14.

The frame (previously generally referenced at 12) includes a plurality of poles 104, 106, 108 and 110. Each of the poles exhibits and elongate and multi-bend configuration (e.g. each pole being uniquely configured in a multiple successive angled fashion between first bottom and second top ends), and which eliminates the need for assembling shorter poles together prior to setting up in the field. The preformed poles 104-110, upon assembly, serve as a frame superstructure to provide support for the cover 10 (as will again be described in further detail with reference to FIGS. 4-6).

A corresponding bottom end of each pole 104-110 is assembled with the platform by being inserted into associated mounting support fixtures 88-94. The poles can likewise be constructed of various materials including steel, aluminum, fiberglass, or forms of high strength plastics, as long as they meet the structural and dynamic integrity requirements of the design.

As best shown in each of FIGS. 2 and 9, the pole constructed superstructure frame further exhibits an upper support assembly including a top plate 112 and a spaced apart lower support plate 114, and between which are sandwich received in pivotally permitting fashion angled upper end locations associated with each of the poles 104-110 (these further being illustrated at 116 and 118 for forward pivotally disposed poles 104 and 110 and further at 120 and 122 for rearward pivotally disposed poles 106 and 108).

The plates 112 and 114 each include mating apertured locations (see as best shown by individual pluralities of mating apertures 124 and 126 in the enlarged illustration of FIG. 9) for receiving upper configured ends 116, 118, 120 and 122 associated with each of the poles. As best seen in FIG. 7, the configured pole ends 116-122 each also include an aperture and which, upon aligning with the aperture patterns 124 and 126, receive individual tightening bolts and nuts (see at 128 and 130 in FIG. 2). In this fashion, the poles may be rotatably converted between expanded use (FIG. 1) and collapsed storage (FIG. 10) positions and, by virtue of the offset configuration of a subset plurality of rear end attachment portions 120 and 122 associated with a like subset pair of poles 106 and 108, establishes a minimized gap between the collapsed poles, this reducing flex or bend of the poles during handling or transport when in the collapsed position.

Referencing again FIG. 1, an explanation of an existing tree stand assembly, defined herein as being used in combination with the adaptable blind of the present invention, includes the ladder stand 16, as customarily known, progressively angled at its upper end and terminating in a generally horizontal and "U" shape (see again at 24) which encircles the diameter of such as a tree 22 or other vertically extending spar or support (e.g. a utility pole or the like). It is further worth pointing out that the upper end support can be either mechanically secured and/or integrally formed with the ladder stand 16 and define the only contact point to the tree or pole 22, and further such as upon being assembled or displaced around the circumference thereof.

In an elevated application such as shown in FIG. 1, the ladder 16 includes a platform 18 which is again secured to the main platform in the manner previously illustrated. As also shown in FIG. 1, the seat 20 includes a back and bottom, these integrally configured with an upper end of the ladder stand 16. A forward cross bar, see at 132 in FIG. 1, can be provided for safety restraint of the user when used in an elevated and tree supported application. A ground supported variation of the adaptable hunting blind is also contemplated and does not require use of the ladder stand 16 components.

Figure 11:
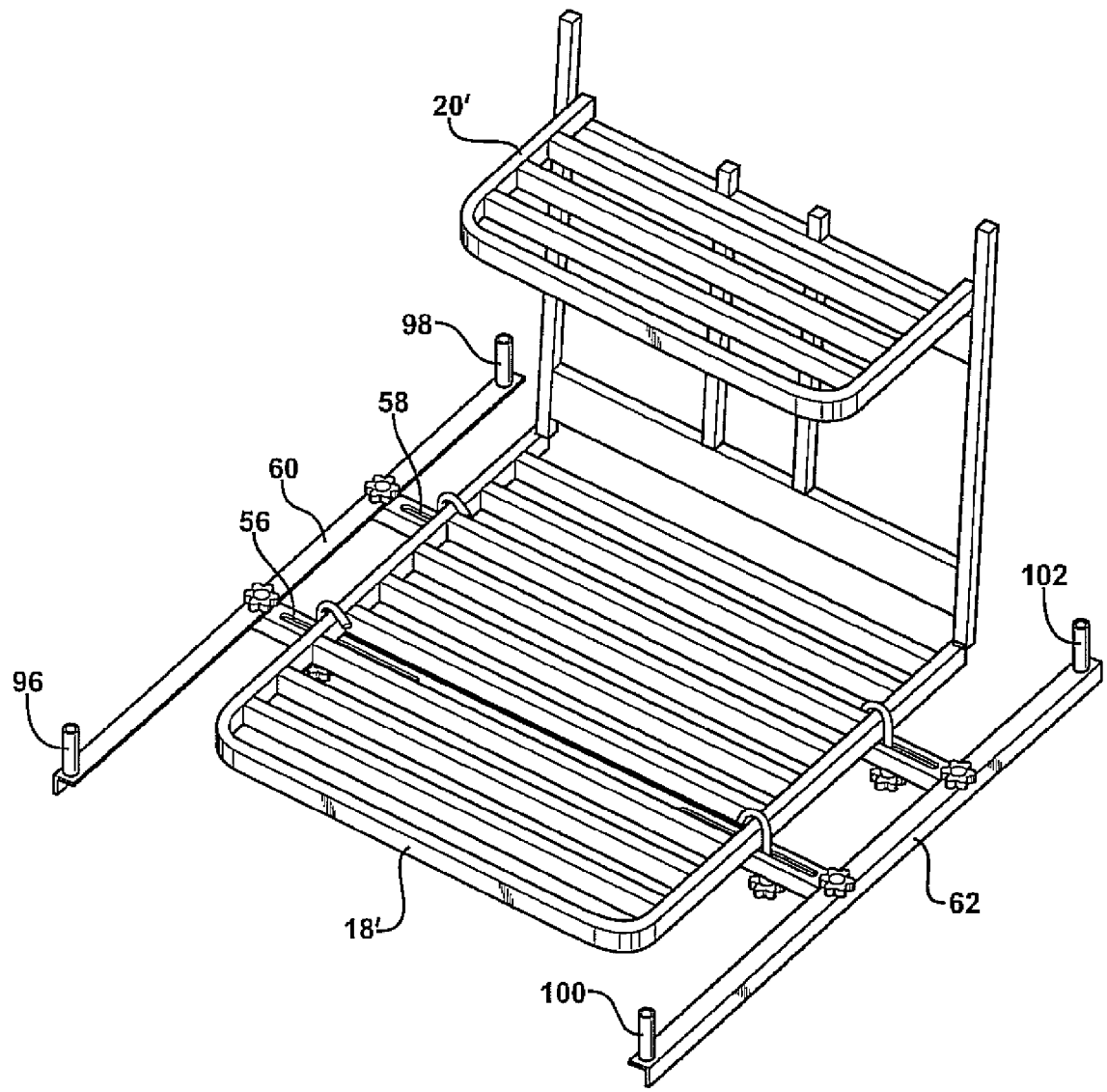
FIG. 11 is an illustration showing a variation of a platform according to the present invention in combination with a known tree stand design.
Figure 12:
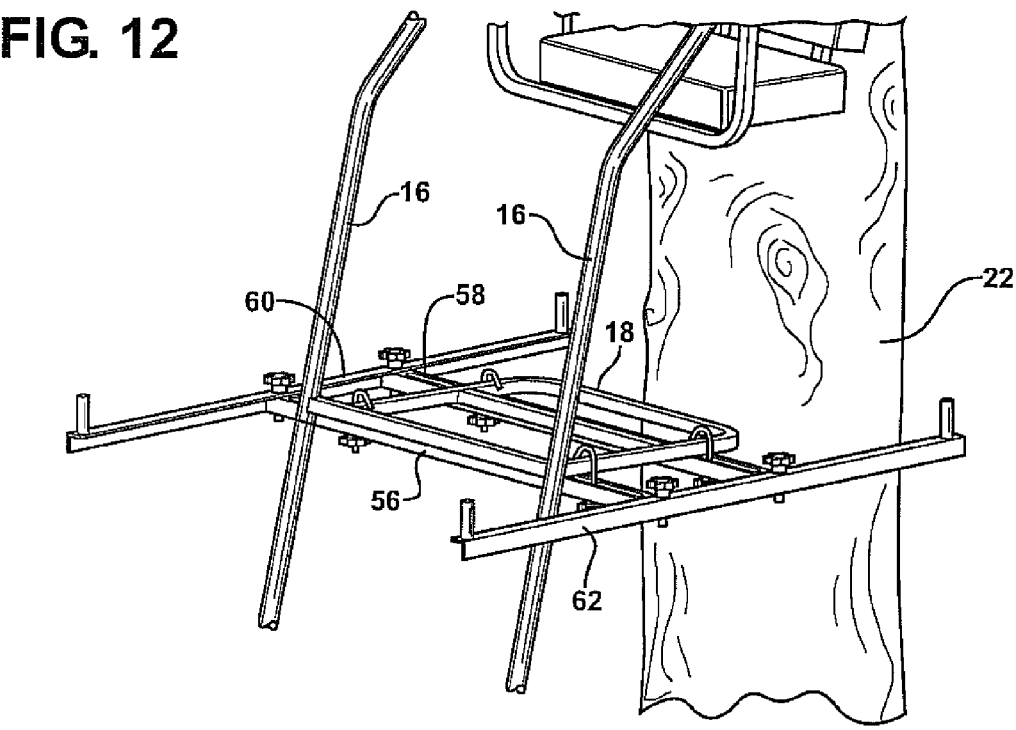
FIG. 12 is an illustration of the variant substantially as shown in FIG. 11, this incorporating a platform design such as shown in FIG. 14, combined with a ladder and seat, and in turn secured to the tree or pole.
Figure 13:
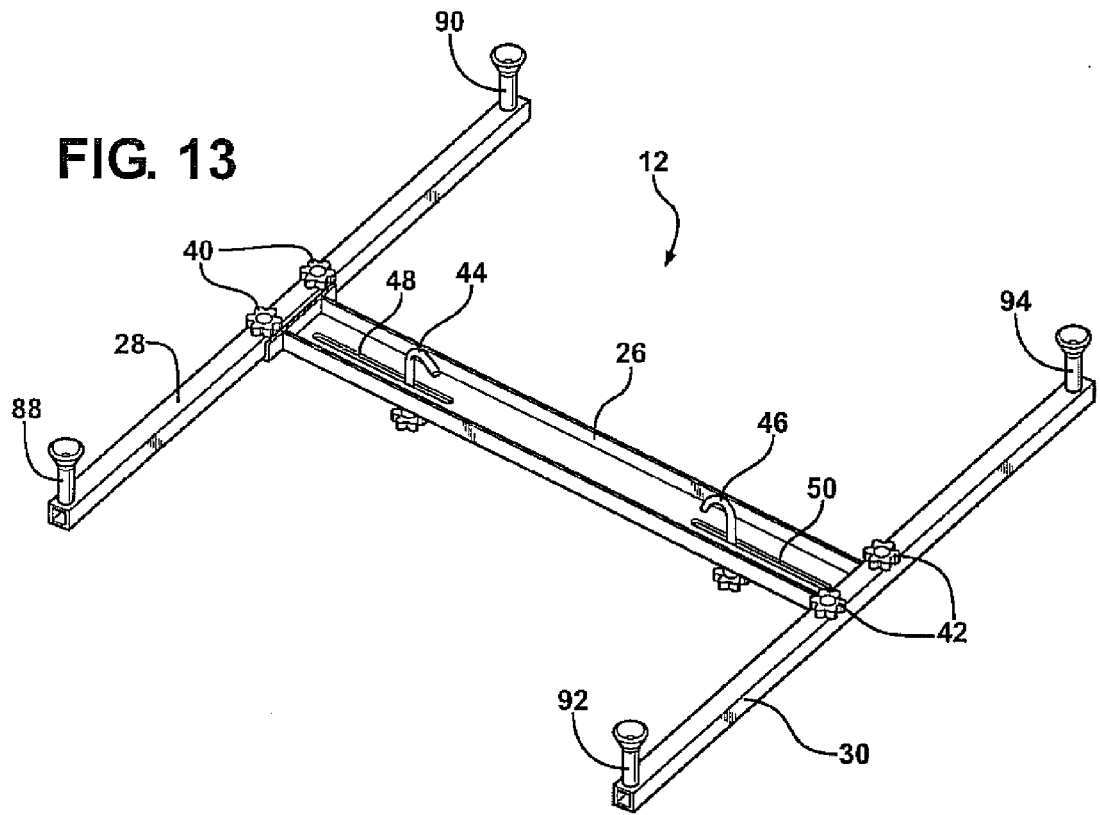
FIG. 13 is a perspective view of a collapsible platform with threaded connections established between a single cross over beam and a pair of crosswise extending and end connected support arms.

FIG. 11 is a further illustration showing a variation of a platform according to the present invention in combination with a known tree stand design. In particular, a variation of a standing platform 18' with modified seat 20' is provided and which is supported upon the platform design of FIG. 14. The version of FIG. 11 is similar to that illustrated in FIG. 1, and by which the strap, band or the like (not shown) can be provided for securing the standing platform to an elevated tree or pole location.

Figure 4:
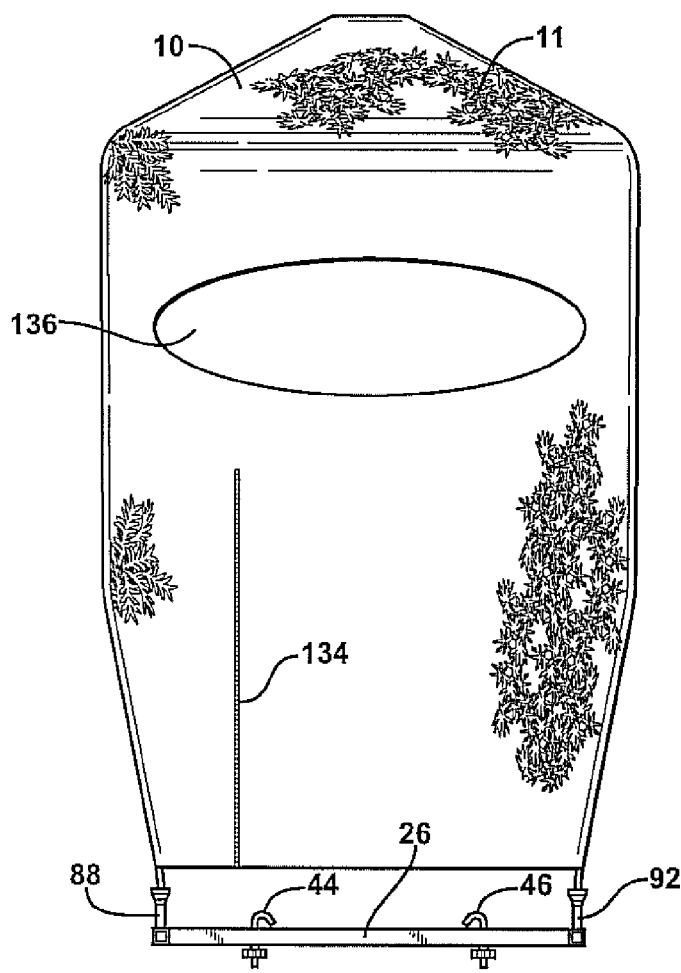
FIG. 4 is a front view of the covering material associated with the collapsible superstructure and exhibiting a front zippered door.

Referring now to FIGS. 4-6, a succession of front, rear and left/right side views are shown respectively of the covering material 10 associated with the collapsible superstructure. In a preferred application, the cover 10 can exhibit such as a camouflage pattern (see at 11 in FIG. 4) and consists of four sides, including front, left, right, and back interconnected sides. As shown in FIG. 4, the front side has a doorway opening, see zipper 134, for entry into the blind, the configuration of the doorway opening capable of being utilized in combination with the ladder stand 16. It is also noted, in the instance of the tree stand being mounted at the base of the tree for hunting on the ground, a user can enter the blind from the front as well. The zippered opening 134 is provided separately from a window 136, this also capable of being zippered, for viewing the outside environment while inside the blind, as well as for permitting access for a long barrel firearm or arrow in the instance of hunting.

Referencing further the rear side illustration of FIG. 5, exhibited are a pair of window openings 138 and 140 (these being positioned such as off to each side of the rear and in order to take into account the diameter of the pole or tree which is usually located to the center of the cover in an elevated mount configuration), this arrangement enabling the user to view outside while seated within the blind. The back side also includes a vertically extending upper zippered (or flap) portion 142, and which zips up to enclose the cover, and such as after being assembled onto the platform 14. A lower portion of the back side may further wrap around the tree stand and does not require a zipper. The side illustration of FIG. 6 is a representative right side view, a corresponding left side view being a substantially mirrored opposite, and by which a further zippered window, at 144, is provided.

The cover 10 includes straps (now shown) which can be sewn in along the edges of the walls and which are used to tie around the frame constructing poles 104-110, thereby securing the cover 10 to the pole frame. Upon removing the poles from the platform frame 14, the cover 10 and poles can optionally stay connected to each other, with the poles collapsed to the position shown at FIG. 10 for ease of transportation, such as in and out of the woods.

An associated assembly method contemplates running a cable (not shown) through the end of each pole, the closed loop configuration achieved being in order to prevent the poles from separating during use Reference is also made to FIG. 2 and which again illustrates similar poles in an assembled configuration.

Novel aspects of the present invention include and are not limited to:

providing total concealment to game and protection against weather;

connecting to existing tree stands and ladder stands, such that no special stand is required to be used with the assembly;

accommodating reasonably designed commercial tree and ladder stands;

permitting user entry and exit from the front of the blind while it is assembled to the ladder stand or a tree stand being mounted at the base of a tree for hunting on the ground;

incorporating an adjuster mechanism consisting of adjustable hooks that slide up and down the cross members of the tree blind's platform, allowing use with multiple platform sizes and widths;

designing of the blind is designed to be easily folded up for carrying in and out of the woods with ease, while the platform can remain on the tree or ladder stand;

providing the poles in a pre-formed state, which eliminates any need for assembling shorter poles together prior to setting up in the field;

optimizing the number of poles required to firmly hold up the cover around the tree stand;

pre-formed poles designed to provide space where space is needed inside the blind, with the bottom of the poles tapering in toward the center of the blind, reducing the size requirements of the blind's platform; and designing the platform such that the user can climb into and out of ladder stand without having to climb thru a hole in the cover, or without having to climb over a cross member in the platform.

Having described my invention, other and additional preferred embodiment will become apparent to those skilled in the art to which it pertains and without deviating from the scope of the appended claims:

I claim:

1. An adaptable blind for use with a ladder including an extending ladder platform, said blind comprising;
    a blind platform comprising a plurality of interconnected length and width extending members;
    a plurality of adjustable clamps attached to locations of said blind platform, said clamps further comprising hooks for drawing said blind platform tight against the ladder platform extending from said ladder and overlaying said blind platform;
    a frame superstructure assembled upon said blind platform and including a plurality of upwardly extending poles collectively establishing a three dimensional interior;
    a pair of channels defined in a main cross over beam of said blind platform, said hooks being displaceably mounted within said channels and laterally adjusted to provide adaptability between multiple sized ladder platforms; and
    a cover assembled over said frame and enclosing said interior, at least one access location permitting a user to ingress and egress to and from said interior.

2. The blind as described in claim 1, said poles each further comprising an elongated and angled member, secured at a lower end to a selected corner location of said platform and, at an upper end, in interconnecting fashion with other said poles.

3. The blind as described in claim 2, said poles being pivotally secured by an attachment assembly comprising a top plate, a lower support plate, and a plurality of fasteners with engaging nuts, such that said poles are converted between use and collapsed positions.

4. The blind as described in claim 1, said cover further comprising at least one of a canvas, mesh or fabric material.

5. The blind as described in claim 4, said cover further comprising at least one access door located on a first selected side, at least one window being formed along one or more additional sides.

6. The blind as described in claim 5, said cover having a specified shape and size and further comprising a camouflage pattern.

7. The blind as described in claim 1, further comprising frame supported bracket fixtures located at corner locations of said platform and to which are secured said poles.

8. An adaptable blind for use with a ladder including an extending ladder platform, said blind, comprising;
    a blind platform including at least one cross over beam and a pair of crosswise extending and end connected support arms;
    a plurality of adjustable clamps attached to locations of said blind platform, said clamps further comprising hooks with configured ends which are capable of being displaced along channels defined in said cross over beam, and in order to be laterally adjustable in order to draw said blind platform tight against the ladder platform extending from said ladder and overlaying said blind platform;
    a frame superstructure assembled upon said blind platform and including a plurality of upwardly extending poles, engageable with corner locations of said support arms, and collectively establishing a three dimensional interior; and
    a cover assembled over said frame and enclosing said interior, at least one access location permitting a user to ingress and egress to and from said interior.

9. The blind as described in claim 8, further comprising bracket mounting portions established between said cross over beam and end connected support arms, fasteners engaging through aligning apertures defined in each of opposite ends of said cross over beam and said end connected support arms in order to assemble said support arms to said cross over beam, said platform being collapsible upon removal of said fasteners.

10. The blind as described in claim 8, said poles each further comprising an elongated and angled member, secured at a lower end to a mounting support fixture affixed or integrally formed with associated edge locations of each of said end support arms, said poles being pivotally inter-engaged at opposite upper ends.

11. The blind as described in claim 10, said poles being pivotally secured by an upper attachment assembly comprising a top plate, a lower support plate, and a plurality of bolts with engaging nuts, such that said assembly can be converted between use and collapsed positions.

12. The blind as described in claim 11, said poles each further comprising angled upper end locations, apertures formed in said upper end locations and which align with apertures in said upper and lower support plates for pivotally mounting said poles to said upper attachment assembly.

13. The blind as described in claim 12, said poles being rotatably converted between expanded use and collapsed storage positions and, including a pair of rear end attachment portions associated with a subset pair of poles, this establishing a minimized gap between said collapsed poles, reducing flex or bend of the poles during handling or transport when in the collapsed position.

14. The blind as described in claim 8, said cover further comprising at least one of a canvas, mesh or fabric material, said cover further comprising at least one access door located on a first selected side, at least one window being formed along one or more additional sides.

15. The blind as described in claim 14, said cover having a specified shape and size and further comprising a camouflage pattern.

* * * * *

UNITED STATES PATENT AND TRADEMARK OFFICE
CERTIFICATE OF CORRECTION

| | | |
|---|---|---|
| PATENT NO. | : 7,735,503 B2 | Page 1 of 1 |
| APPLICATION NO. | : 12/349229 | |
| DATED | : June 15, 2010 | |
| INVENTOR(S) | : Scott Jenkinson | |

It is certified that error appears in the above-identified patent and that said Letters Patent is hereby corrected as shown below:

Col. 1 and Title page
Title - remove the word "STRAND" and insert --STAND--

Signed and Sealed this

Thirtieth Day of November, 2010

David J. Kappos
*Director of the United States Patent and Trademark Office*